US010050487B2

(12) United States Patent
Biwersi et al.

(10) Patent No.: US 10,050,487 B2
(45) Date of Patent: Aug. 14, 2018

(54) SLOTLESS ELECTRICAL MACHINE WITH CONCENTRATED WINDING (71) Applicant: MOVING MAGNET TECHNOLOGIES (MMT), Besançon (FR)

(72) Inventors: Stéphane Biwersi, Frambouhans (FR); Lionel Billet, Besançon (FR)

(73) Assignee: Moving Magnet Technologies (MMT), Besancon (FR)

( * ) Notice: Subject to any disclaimer, the term of this patent is extended or adjusted under 35 U.S.C. 154(b) by 302 days.

(21) Appl. No.: 15/025,148

(22) PCT Filed: Oct. 7, 2014

(86) PCT No.: PCT/FR2014/052545
§ 371 (c)(1),
(2) Date: Mar. 25, 2016

(87) PCT Pub. No.: WO2015/052432
PCT Pub. Date: Apr. 16, 2015

(65) Prior Publication Data
US 2016/0233734 A1 Aug. 11, 2016

(30) Foreign Application Priority Data

Oct. 7, 2013 (FR) ...................................... 13 59683

(51) Int. Cl.
*H02K 3/46* (2006.01)
*H02K 1/14* (2006.01)
(Continued)

(52) U.S. Cl.
CPC ............... *H02K 3/46* (2013.01); *H02K 1/146* (2013.01); *H02K 1/2706* (2013.01); *H02K 3/04* (2013.01);
(Continued)

(58) Field of Classification Search
CPC ........................................................ H02K 3/46
See application file for complete search history.

(56) References Cited

U.S. PATENT DOCUMENTS 3,360,668 A 12/1967 Faulhaber
3,546,507 A 12/1970 Wengel
(Continued)

FOREIGN PATENT DOCUMENTS

GB 903285 A 8/1962
JP 2004254443 A 9/2004
(Continued)

OTHER PUBLICATIONS

Yan, Guo-Jhih, et al.: "The Development of Micro Brushless Slotless Motors with 4-Pole Rotor Design"; Journal of Science and Innovation, vol. 2, No. 1, 2012, pp. 39-48.

*Primary Examiner* — Robert W Horn
(74) *Attorney, Agent, or Firm* — Harness, Dickey & Pierce, PLC (57) ABSTRACT

An electrical machine includes a tubular rotor magnetised to have circumferential polar alternations, and a stator including a body that is traversed by a channel having an inner transverse section that substantially corresponds to the outer transverse section of the rotor, the body carrying a plurality of windings, the stator being surrounded by an outer ferromagnetic envelope, the body being extended by three, four or six radial projections made from an electrically insulating material having, in the transverse cross section, a longitudinal core for receiving a winding, the core being extended by a peripheral extension having an outer surface that matches the inner surface of the envelope and covers the wound area. A method for producing such an electrical machine is also provided.

21 Claims, 4 Drawing Sheets

(51) Int. Cl.
- *H02K 3/34* (2006.01)
- *H02K 3/52* (2006.01)
- *H02K 1/27* (2006.01)
- *H02K 3/04* (2006.01)
- *H02K 15/00* (2006.01)
- *H02K 15/03* (2006.01)

(52) U.S. Cl.
CPC ............ *H02K 3/345* (2013.01); *H02K 3/522* (2013.01); *H02K 15/0025* (2013.01); *H02K 15/03* (2013.01)

(56) References Cited

U.S. PATENT DOCUMENTS

| | | | |
|---|---|---|---|
| 3,747,320 A | 7/1973 | Vuffray | |
| 4,186,322 A | 1/1980 | Besson | |
| 4,818,911 A * | 4/1989 | Taguchi | H02K 1/148 |
| | | | 310/194 |
| 4,985,652 A | 1/1991 | Oudet et al. | |
| 5,298,825 A | 3/1994 | Oudet et al. | |
| 5,334,893 A | 8/1994 | Oudet et al. | |
| 5,444,313 A | 8/1995 | Oudet | |
| 5,512,871 A | 4/1996 | Oudet et al. | |
| 5,521,451 A | 5/1996 | Oudet et al. | |
| 5,559,378 A | 9/1996 | Oudet et al. | |
| 6,313,553 B1 | 11/2001 | Gandel et al. | |
| 7,028,545 B2 | 4/2006 | Gandel et al. | |
| 7,589,445 B2 | 9/2009 | Gandel et al. | |
| 7,644,635 B2 | 1/2010 | Prudham et al. | |
| 7,663,287 B2 * | 2/2010 | Haga | H02K 3/325 |
| | | | 310/260 |
| 7,898,122 B2 | 3/2011 | Andrieux et al. | |
| 7,906,959 B2 | 3/2011 | Frachon et al. | |
| 8,102,093 B2 | 1/2012 | Prudham | |
| 8,339,003 B2 | 12/2012 | Prudham | |
| 8,638,014 B2 * | 1/2014 | Sears | H02K 5/128 |
| | | | 310/86 |
| 8,860,282 B2 | 10/2014 | Gandel et al. | |
| 9,755,478 B2 * | 9/2017 | Amagi | H02K 7/106 |
| 2005/0218727 A1 | 10/2005 | Gandel et al. | |
| 2006/0123903 A1 | 6/2006 | Gandel et al. | |
| 2008/0250873 A1 | 10/2008 | Prudham et al. | |
| 2008/0284261 A1 | 11/2008 | Andrieux et al. | |
| 2009/0021093 A1 * | 1/2009 | McNamara | H02K 3/47 |
| | | | 310/89 |
| 2009/0174280 A1 | 7/2009 | Prudham | |
| 2011/0031824 A1 | 2/2011 | Prudham | |
| 2011/0043194 A1 | 2/2011 | Frachon et al. | |
| 2012/0104905 A1 | 5/2012 | Prudham et al. | |
| 2012/0274167 A1 * | 11/2012 | Kim | H02K 3/47 |
| | | | 310/156.08 |
| 2013/0169270 A1 | 7/2013 | Delbaere et al. | |
| 2014/0283732 A1 | 9/2014 | Heinrich | |
| 2015/0263572 A1 | 9/2015 | Hyppias et al. | |
| 2015/0280508 A1 * | 10/2015 | Hirota | H02K 3/345 |
| | | | 310/215 |
| 2016/0233734 A1 * | 8/2016 | Biwersi | H02K 1/146 |
| 2017/0358962 A1 * | 12/2017 | Morton | H02K 1/18 |

FOREIGN PATENT DOCUMENTS

| | | |
|---|---|---|
| JP | 2008154340 A | 7/2008 |
| JP | 2010242407 A | 10/2010 |

* cited by examiner

SLOTLESS ELECTRICAL MACHINE WITH CONCENTRATED WINDING

CROSS-REFERENCE TO RELATED APPLICATIONS

This application is a National Phase Entry of International Application No. PCT/FR2014/052545, filed on Oct. 7, 2014, which claims priority to French Patent Application Serial No. 1359683, filed on Oct. 7, 2013, both of which are incorporated by reference herein.

TECHNICAL FIELD

The present invention relates to the field of permanent-magnet machines, and more particularly motors and micromotors intended to produce high mechanical powers at high speed and in small diameters.

BACKGROUND

In the field of magnet-type machines with small dimensions, typically, but not limitatively, with a diameter of less than 30 mm, it is common to use slotless stator topologies rather than slotted topologies, corresponding to a stator consisting of a plurality of teeth, wound or not. Slotless solutions are particularly suitable for small diameters, in particular when it is wished to obtain a very low or even zero current-free torque, which proves to be very difficult with slotted structures whether because of the stator circuit (geometric tolerances) or with regard to the rotor (geometric tolerances or homogeneity of the permanent magnets). More particularly, a slotless machine having a homogeneous magnetic air gap has a zero current-free torque. Because of this, such a machine is particularly favourable for use at very high speed (typically from a few tens of thousands to a few hundreds of thousands of revolutions per minute) since the absence of current-free torque minimises torque ripple, vibrations, noise, losses, etc.

On the other hand, the absence of stator teeth reduces the power density of such machines, and reduces the relevance thereof for use in large-diameter structures and/or ones intended to produce high mechanical powers at low speed. The winding is a particularly critical problem in slotless motors, in particular in the case of extreme miniaturisation, typically for diameters of less than 10 millimetres. By way of example, the functioning of such motors is described in the article by G. J. Yan, J. H. Wang & S. J. Yan, J. Sci. Innov., 2012, Vol. 2, No. 1, 39-48.

Self-supporting circumferential windings (or "bell" windings) traditionally used in these slotless motors are described for example in the patents GB 903285 and GB 1046993. These solutions give rise to high manufacturing costs, in particular when it is wished to produce a motor with a very small diameter. Such a winding is also not suitable for configurations using a small number of turns of wire with a large diameter, as is frequently the case when it is sought to achieve high speeds.

Solutions are known proposing a concentrated winding (a winding where the turns are contiguous) but based on separate coils, referred to as self-supporting (also referred to as "air core", that is to say wound individually and without any support, in particular a ferromagnetic one) that it is necessary to position in the stator and then fix, often via the use of overmoulding, and finally to isolate from the stator. This involves expensive and complex implementations.

To remedy this, the patent application JP 2008/154340 proposes the use of non-magnetic shells in the form of a cross-section of a cylinder each carrying a self-supporting coil positioned by means of one or more protrusions extending radially inwards, the coils then being held in place by resin, and the shells finally being connected together. This implementation process is complex and connecting together a plurality of parts in a micromotor requires very strict tolerances in design and positioning of the parts. Another solution described in the patent application JP 2004/254443 describes the use of an articulated support, placed flat, and on which the coils are wound by an automated process, said support then being coiled and inserted in the motor housing. Such a solution is not suited to motors of very small sizes since the extremely small thicknesses of material at the articulation between each zone supporting the coils makes the assembly extremely fragile.

To remedy certain defects described above, the use of a single piece on which the coils are wound is an advantageous solution. The patent application JP 2010/242407 illustrates a variant thereof where three coils are wound from the outside on a cylinder extended by three protrusions extending radially outwards and serving as supports for the winding. However, such a solution requires the addition of an insulator between the winding and the flux-closure part enclosing the winding. In addition, in very small diameters (typically below 10 mm), the thickness of these protrusions becomes a real problem.

In the prior art the American patent application US 2012/0274167 is known, describing a DC brushless motor having a stator without grooves and more specifically a DC brushless motor having a stator without grooves designed to avoid the presence of forces interfering with a rotation in the rotor by the formation of a shuttle rotor from an insulating material while simultaneously allowing supply to the DC motor at high rate; the embodiment according to this document of the prior art relates to the winding of a large quantity of coils in the direction of the length of a rotary shaft by forming a plurality of winding projections that make it possible to wind the coils on a shuttle rotor, so that the winding protuberances project with spaces at predefined intervals along the circumference of the external peripheral surface of the shuttle rotor body. Once again, the use of such a solution in small diameters is problematic.

The solutions of the prior art do not make it possible to achieve optimum performances (speed, power). Moreover, the configuration of the stators makes it difficult to carry out winding with wires with a diameter suited to high powers. In particular, for motors intended for high speeds, several hundreds of thousands of revolutions per minute, it is necessary to reduce the number of turns per coil and per motor phase, and therefore to increase the cross-section of the winding wires. In general, the solutions proposed in the prior art are not suited to the case of micromachines, typically with a diameter of less than 10 mm.

Thus the solution proposed by the American patent application US 2012/0274167 provides a large number of coils, leading to a large outside diameter. Moreover, this solution involves the use of additional insulation parts and grooving of the external envelope.

SUMMARY

The solution presented here therefore sets out to remedy all or some of the problems stated above, and more particularly to use a winding solution that is easier and particularly suited to a high level of automation for small-diameter machines, relying on a concentrated winding carried out on a single coil body having a form suited to use in small diameters.

To this end, the invention concerns, in accordance with its acceptance, a machine comprising a tubular rotor magnetised so as to have circumferential pole alternations, and a stator comprising a body through which there passes a channel with an inside cross-section corresponding substantially to the outside cross-section of said rotor, said body supporting a plurality of coils, said stator being surrounded by a ferromagnetic external envelope, characterised in that said body is extended by three, four or six radial protuberances made from an electrically insulating material, having, in cross-section, a longitudinal core for receiving a coil, said core being extended by a peripheral extension having an external surface complementary to the internal surface of said envelope and covering the wound area. The advantage of this solution is to be able to coil on a support (the body) having housings intended to receive the winding, thus affording precise positioning of the windings and easy assembly while offering a robust structure and not requiring inserting an insulator between the windings and the envelope serving as a flux-closure piece.

Preferably, the machine according to the invention has a body comprising three protuberances and a rotor with one or two pairs of poles, the body having a central part with a triangular cross-section. Advantageously, the radius of the rotor is greater than the distance between the longitudinal axis of said channel of the stator and the plane passing through the internal turn of the winding. Preferably, the external radius of the envelope is less than 5 millimetres.

According to a first embodiment, said magnetised rotor is formed by an assembly of magnets in the form of tiles magnetised diametrically, in alternating directions. According to a second embodiment, said magnetised rotor is formed by a sintered monolithic material magnetised in a single direction or alternating directions. Advantageously, said body has, at one of the ends, metallised surfaces for soldering the winding wire on the one hand and connection with the connection element on the other hand. According to an advantageous embodiment, said stator is produced from an elastically deformable material. According to a variant, said protuberances are slotted along a radial symmetry plane.

This winding will typically be produced via an automatic winder, before the coil support is inserted in the flux closure piece. By extension, the invention will therefore also relate to an assembly method consisting of firstly producing the body, carrying out the windings, then inserting this sub-assembly inside the envelope and performing the necessary connection operations and finally inserting the movable part. More particularly, the body will comprise grooves extending axially and transversely and making it possible to guide and hold the wire, while naturally protecting the coils so that they do not come into contact with the flux closure piece. This will be allowed by the fact that the body has radial protuberances made from an electrically insulating material, these comprising a core for receiving the coils.

If a "straight" winding, that is to say one leading to a coil with a rectangular cross-section, is the most conventional implementation, in the case of a rotary machine with a small diameter and/or comprising a small number of coils (for example three), this gives rise to the fact that the coils "straddle" the rotor, in particular meaning that the winding is carried out once the rotor is inserted in the support and, for example, the body is produced from at least two parts, typically two identical shells connected together axially in a single support before winding. This is however not the most favourable solution. This is why, according to a preferential variant, the grooves will be produced so that their transverse part describes a circular profile, making it possible to produce coils with a cylindrical shape, and to have a body not interfering with the rotor.

According to another variant, the body may be produced so as to have a certain elasticity, thus making it possible better to accept some tolerances when it is inserted in the envelope. Since a connection is a particular sensitive problem, because of the size and the small diameters of the wire used, it can be imagined that the body includes connection elements to which the wires of the coils will be directly soldered. Another method for producing the body and the winding, making it possible to integrate the connections, would be to use a solution of the MID (moulded interconnected device) type, combining a plurality of three-dimensional materials (typically plastics material and copper).

Since the invention is particularly intended for designs of small dimensions, according to a particular embodiment, the external radius of the rotor is between 0.4 R and 0.5 R, with R designating the external radius R of the stator. According to a variant, the mean width $L_N$ of the core is between 0.5 R and 1.2 R. According to a particular embodiment, the maximum width $L_P$ of the peripheral extension is between 1.1 R and 1.8 R and in any event greater than $E+L_N$, where E designates the thickness of the coil.

In a variant, the cross-section of the cores is constant. In a second variant, the cross-section of the cores is restricted in the direction of the outside. The envelope of the stator is composed either of a packet of stacked sheets or a solid material wound or machined.

In addition to the simplification of the stator structure mentioned above, the present invention also sets out to remedy one of the faults of slotless machines compared with slotted machines, namely a lower torque factor for equivalent size due to the fact that the magnetic air gap is larger in a slotless structure, thus greatly reducing the torque constant. In general terms, the solution proposed consists of using a material loaded with ferromagnetic particles disposed in the space where the windings are disposed, that is to say the mechanical air gap between the rotor and the envelope, minus the mechanical clearance necessary for the contactless rotation of the rotor.

According to an advantageous variant, said body is partially or entirely produced from such a material. According to another variant, such a material is injected in order to complete the space left empty by the body and the windings, minus the mechanical clearance necessary for the contactless rotation of the rotor. According to yet another variant, the external envelope is produced from a plastics material loaded with ferromagnetic particles. According to another variant, said external envelope is also produced from a plastics material loaded with ferromagnetic particles.

Concerning the increase in the torque constant compared with a conventional slotless machine, it is a case of filling, to the maximum possible extent, and as homogeneously as possible, the air gap between the rotor and the envelope, minus the space necessary for the contactless rotation of the rotor, with a mixture consisting of a non-magnetic binder and ferromagnetic powder. In all cases, the use of such mixtures is particularly favourable since such an assembly is electrically insulated and leads to very low magnetic losses. More particularly, the solution proposed here is, according to a preferential embodiment, continuous with the idea of using a single body supporting the coils. According to clever designs, as described below, in this way a structure will be obtained with an almost homogeneous distribution of this material in the air gap, increasing the useful flux density and therefore the torque constant, but without creating a current-free torque.

Thus, according to a first variant, the body will be directly produced with such a mixture (for example by injecting a mixture of plastic binders and ferromagnetic particles or by any other suitable method), said body being cleverly produced so as to fill the mechanical air gap between rotor and envelope as completely and homogeneously as possible, leaving only the clearance necessary for the contactless movement of the moving part. According to another variant, it can be imagined that the body would at some points be produced with such a mixture and at other points with one or more materials having for example better mechanical properties (for reasons of strength) or conductive properties to facilitate the connections. According to another alternative, the body will be produced in a hollowed-out way with non-magnetic material so as to comprise only the material necessary for its correct strength, but releasing a maximum amount of space so as to complete the air gap with a mixture of resin and ferromagnetic particles.

Concerning the magnetic properties of the mixture, it should be noted that the findings made by the applicant show that, even with very modest properties, the gain in performance is well recognised. Thus a test carried out with a mixture having a mean permeability of around 20 and low hysteresis (coercive field of around 50 A/m) in the context of a three-phase rotary motor structure with a diameter of 25 mm with three coils and two pairs of rotor poles showed a gain of 20% on the torque constant. This is particularly advantageous since, with such limited magnetic properties, the iron losses remain extremely low.

It is therefore possible to obtain appreciable gains with relative permeabilities of less than 100 so that the use of mixtures with relatively high permeability such as materials of the Somaloy® type (which typically have relative permeabilities of several hundreds and conventional magnetic materials exceeding one thousand) is not absolutely necessary, which presents a strong advantage, both economical and in terms of process becoming less constraining. The invention also relates to a method comprising a step of producing said body, a step of winding a conductive wire around each of the cores, and a step of inserting said body thus wound in said envelope (2).

BRIEF DESCRIPTION OF THE DRAWINGS

The invention will be better understood in the light of the following figures relating to non-limitative example embodiments, where:

FIG. 2b presents an exploded view of the motor of FIG. 2a;

DETAILED DESCRIPTION

First Example Embodiment

Figure 1A:
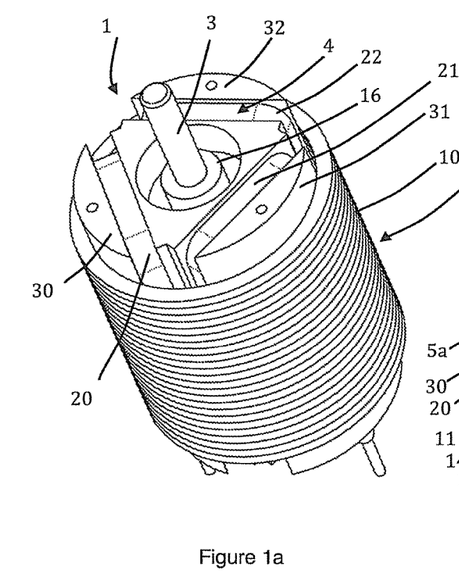
FIG. 1a presents a motor according to the invention in a perspective view in a first embodiment.

FIG. 1a shows a three-phase slotless electric motor (1) according to a first embodiment. Tubular in shape, it comprises at the stator an external envelope (2) here in the non-limitative form of a packet of metal sheets (10) stacked in the axial direction, that is to say along the rotation axis (3). The movable assembly consists of a rotation shaft (3) and a cylindrical magnetised rotor (7), here having two pairs of magnetised poles (two alternations of north and south poles). In the example described, the magnetised poles are formed by longitudinal magnets (11 to 14), magnetised transversely in order to have circumferential north-south alternations. The external surface of the magnets is in the form of a portion of a cylinder, so that the assembly of the magnets has a tubular external surface, with a circular cross-section that is constant over the entire height of the motor.

The central part (15) consists of a ferromagnetic piece forming a magnetic yoke and providing transmission of the torque to the spindle (3) that passes through it or extends it. The stator assembly, apart from the external envelope (2), also comprises a body (4) depicted in detail in FIG. 1d. This body (4) has a central longitudinal channel (16) as well as three protuberances (17 to 19) forming cores (20 to 22) on which three separate electrical coils (5a, 5b and 5c) are wound, separated each by an angle of 120° in order to form a three-phase excitation assembly.

Figure 1B:
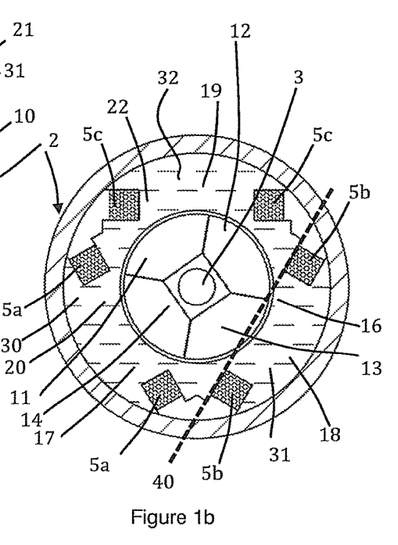
FIG. 1b presents the motor in FIG. 1a in a cross-sectional view.
Figure 1C:
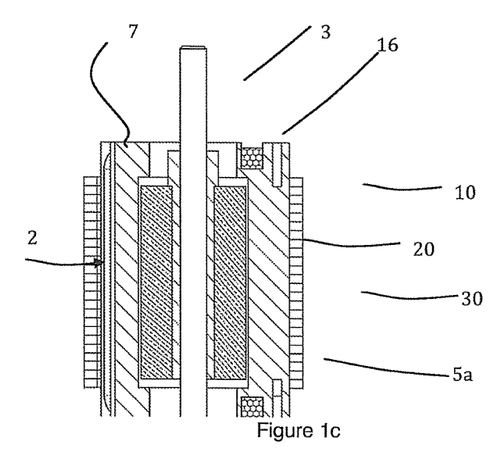
FIG. 1c presents the motor in FIG. 1a in an axial-section view passing through the rotation axis.

As can be appreciated in FIG. 1b, the bodies (4) of the coils are distributed over the internal periphery of the external envelope (2) and form grooves or slots in which the coils (5a, 5b and 5c) are wound. The cores (20 to 22) are extended radially by peripheral extensions (30 to 32) having an external surface complementary to the internal surface of the external envelope (2). These peripheral extensions (30 to 32) cover the coiled zone surrounding the cores (20 to 22) in order to provide the electrical insulation of the turns of the windings (5a to 5c).

In this first embodiment, the coils (5a, 5b and 5c) are installed so that they partially surround the magnetised movable part (7), thus producing a compact assembly. In this example, the channel (16) has a radius greater than the distance measured radially between the central longitudinal axis (3) of the motor, and the plane (40) passing through the internal turn of the coils (5a, 5b, 5c). This solution maximises the useful volume of copper in the available space. This solution involves placing the rotor (7) in the channel (16) of the stator, prior to the winding.

For a stator with external radius R, the external radius of the rotor is between 0.4 R and 0.5 R. The mean width $L_N$ of the core is between 0.5 R and 1.2 R. The cross-section of this core (20 to 22) may be constant, or may be restricted in the direction of the outside, as illustrated for example by FIGS. 2a to 2c. The core may also broaden towards the outside, but this solution is less advantageous. The maximum width $L_P$ of the peripheral extension (30 to 32) is between 1.1 R and 1.8 R and in any event greater than $E+L_N$, where E designates the thickness of the coil (5a, 5b, 5c).

The coil body (4), detailed in FIGS. 1a-d, is formed in a single piece, the central area of which has a circular piercing (8) able to allow the rotation spindle (3) and any guide element (not shown here) to pass. On the periphery of the body (4), three extensions (17 to 19) are provided, delimiting the locations for the windings of the three coils (5a, 5b and 5c). Each of the extensions (17 to 19) is symmetrical with respect to a radial mid-plane.

Figure 1D:
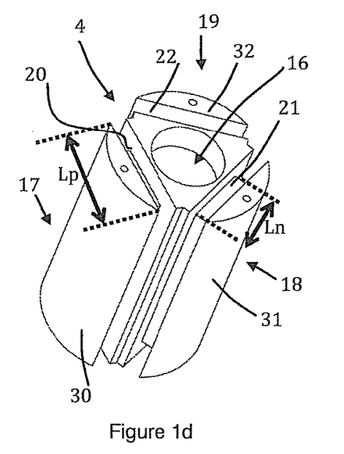
FIG. 1d presents an isolated view of the coil support in the first embodiment.

Each location is characterised by grooves or slots (6) that describe a closed path all around the cores (20 to 22) and thus extending in the axial and transverse direction with respect to the rotation axis (3) of the motor (1). The unicity of the coil body (4) and the presence of the grooves (6) make implementation of the assembly thus coiled easy, precise and sure.

Second Example Embodiment

Figure 2A:
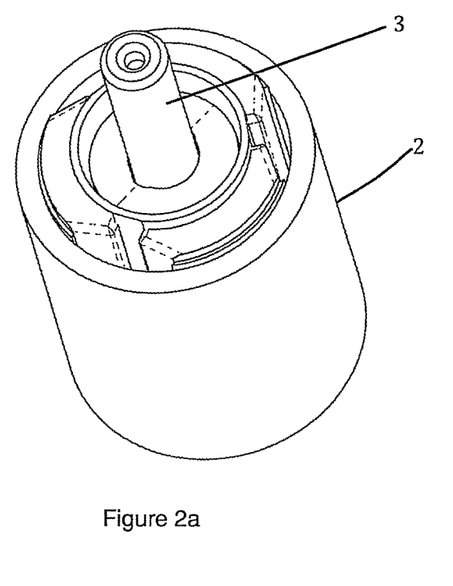
FIG. 2a presents a motor according to the invention in a perspective view in a second embodiment.
Figure 2B:
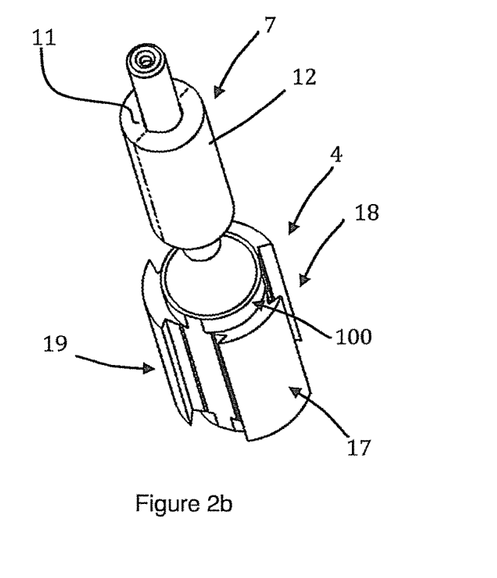
Figure 2C:
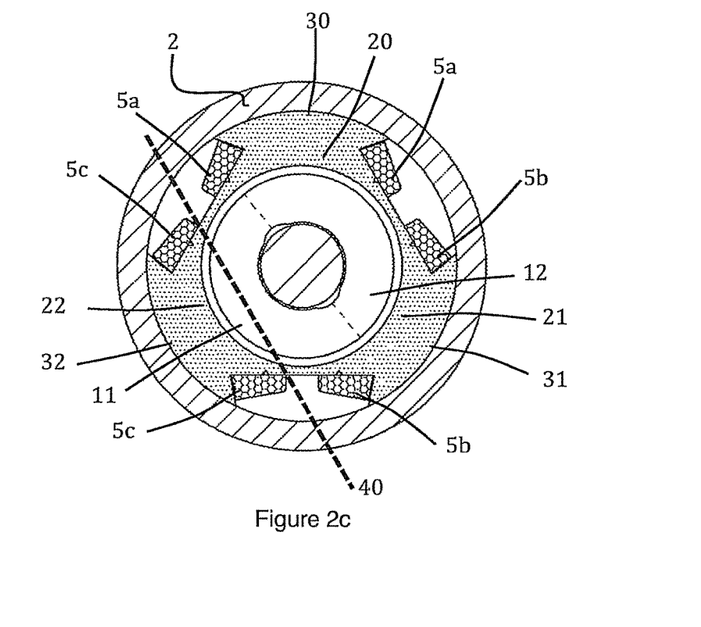
FIG. 2c presents the motor of FIG. 2a in a cross-sectional view.

FIGS. 2a, 2b and 2c depict a second example embodiment. The external envelope (2) is produced from a solid ferromagnetic material. The stator body is produced in a piece moulded from plastics material loaded with ferromagnetic particles. The rotor comprises a cylindrical magnet formed by a pair of poles by assembling a tubular-shaped single-piece magnet, magnetised substantially diametrically in order to have a north pole on a tubular half-perimeter and a south pole on a complementary tubular half-perimeter (12).

The extensions (17 to 19) differ from those described in relation to the first embodiment through the fact that the cores (20 to 22) have a trapezoidal-shaped cross-section, with the large base on the internal side and the large base on the external side, which makes it possible to maximise the filling with copper with respect to the available space. The plane (40) passing through the bottom turns of the coil passes through the rotor, but an axial extension (100) enables the winding not to intersect the plane (40). Thus, since the channel (16) has a constant cross-section, it is possible to introduce the rotor by an axial movement of the wound stator. The peripheral extension (30 to 32) completely covers the windings (5a, 5b, and 5c).

Third Variant Embodiment

Figure 3:
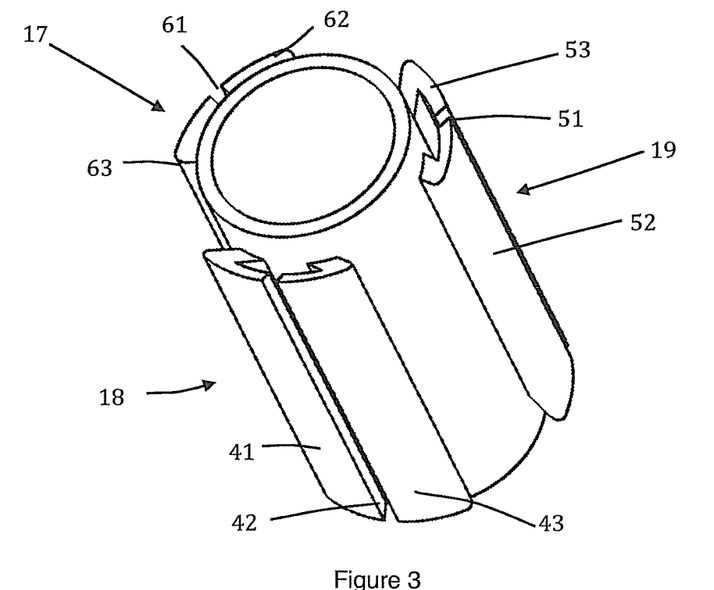
FIG. 3 presents a particular embodiment of a coil support according to the invention.

FIG. 3 depicts a body, the extensions (17 to 19) of which are split by longitudinal slits (41, 51, 61). In the example described, the protuberances (17 to 19) are formed by flanges (42, 43; 52, 53; 62, 63) symmetrical with respect to the radial plane passing through the corresponding extension. The extensions (17 to 19) are thus elastically deformable.

Fourth Variant Embodiment

Figure 4:
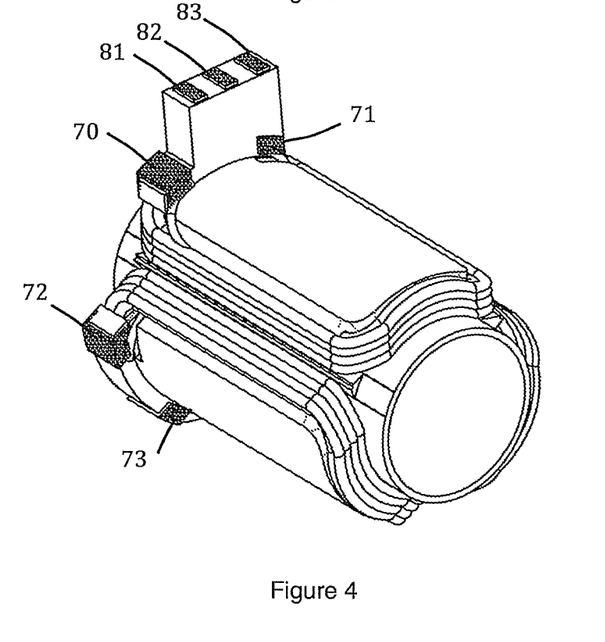
FIG. 4 presents a particular embodiment of coil connections on a wound support according to the invention.

FIG. 4 presents a variant embodiment in which some areas of the stator body are metallised in order to form areas (70 to 73) enabling the wires of the windings to be soldered, and extended by metallised tracks in order to end up at second metallised areas (81 to 83) providing the electrical connection.

Fifth Variant Embodiment

Figure 5A:
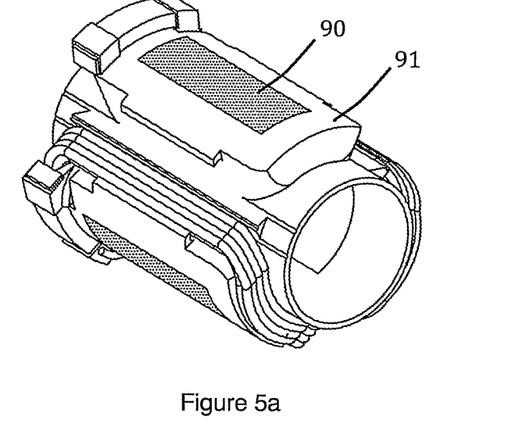
FIG. 5a presents another particular embodiment of a wound support according to the invention.
Figure 5B:
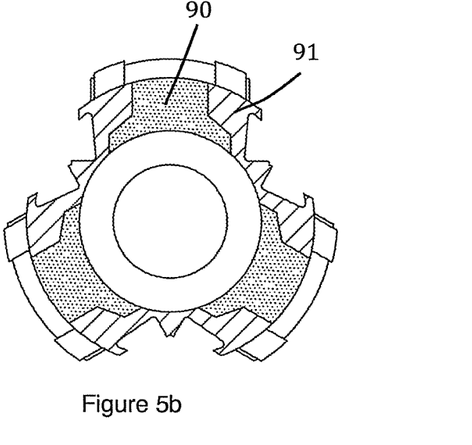
FIG. 5b presents the wound support of FIG. 5a in a cross-sectional view.

FIGS. 5a and 5b present a variant in which the stator body is produced with a ferromagnetic internal part (90), for example a piece made from plastics material loaded with ferromagnetic particles, and an external part (91) made from plastics material. In general terms, for the different variants, the ferromagnetic material advantageously has a relative permeability below 100 and a low coercivity (coercitive field less than 100 A/m) in order to reconcile the satisfactory closure of the field lines and the limitation of the expansion torque and iron losses.

Sixth Variant Embodiment

Figure 6:
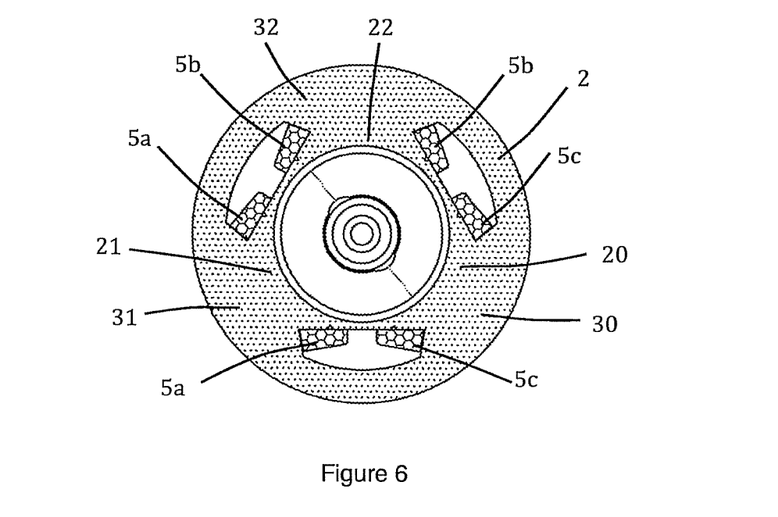
FIG. 6 presents a cross-sectional view of the support according to an alternative embodiment.

FIG. 6 describes an alternative where the stator body forms a single piece with the tubular envelope (2), by assembly or overmoulding with the same plastics material loaded with ferromagnetic particles.

The invention claimed is:

1. An electrical machine comprising a tubular rotor magnetised so as to have circumferential pole alternations, and a stator comprising a body through which there passes a channel with an inside cross-section corresponding substantially to the outside cross-section of said rotor, said body supporting a plurality of coils, said stator being surrounded by a ferromagnetic external envelope, said body being extended by three, four or six radial protuberances made from an electrically insulating material, having, in cross-section, a longitudinal core for receiving a coil, said core being extended by a peripheral extension having an external surface complementary to the internal surface of said envelope and covering a wound area.

2. An electrical machine according to claim 1, wherein said body comprises three protuberances and said rotor comprises one or two pairs of poles, said body having a central part with a triangular cross-section.

3. An electrical machine according to claim 1, wherein a radius of said rotor is greater than the distance between the longitudinal axis of said channel of said stator, and a plane passing through an internal turn of a winding.

4. An electrical machine according to claim 1, wherein an external radius of said envelope is less than 5 mm.

5. An electrical machine according to claim 1, wherein a space between said envelope and said rotor is at least partially filled with a mixture containing ferromagnetic particles.

6. An electrical machine according to claim 5 wherein said mixture is a plastics material loaded with said ferromagnetic particles.

7. An electrical machine according to claim 1, wherein said body is at least partially produced from a mixture loaded with ferromagnetic particles.

8. An electrical machine according to claim 1, wherein said body forms, with said envelope, a single piece produced from a mixture loaded with ferromagnetic particles.

9. An electrical machine according to claim 1, wherein said external envelope is produced from a plastics material loaded with ferromagnetic particles.

10. An electrical machine according to claim 1, wherein said magnetised rotor is formed by an assembly of magnets in the form of tiles magnetised diametrically in alternating directions.

11. An electrical machine according to claim 1, wherein said magnetised rotor is formed by a sintered single-piece material magnetised in a single direction or alternating directions.

12. An electrical machine according to claim 1, wherein said body has, at one of the ends, metallised surfaces for soldering the winding wire on the one hand and connection with the connection element on the other hand.

13. An electrical machine according to claim 1, wherein said body is produced from an elastically deformable material.

14. An electrical machine according to claim 1, wherein said protuberances are slotted along a radial symmetry plane.

15. An electrical machine according to claim 1, wherein an external radius of said rotor is between 0.4 R and 0.5 R, with R designating the external radius of the rotor.

16. An electrical machine according to claim 1, wherein a mean width $L_N$ of said core is between 0.5 R and 1.2 R.

17. An electrical machine according to claim 1, wherein a maximum width $L_P$ of said peripheral extension is between 1.1 R and 1.8 R and greater than $E+L_N$, where E designates the thickness of said coil.

18. An electrical machine according to claim 1, wherein said cross-section of said cores is constant.

19. An electrical machine according to claim 1, wherein said cross-section of the cores is restricted in a direction of an outside.

20. An electrical machine according to claim 1, wherein said envelope includes a packet of stacked metal sheets.

21. A method for producing an electrical machine comprising a tubular rotor magnetised so as to have circumferential polar alternations, and a stator comprising a body through which there passes a channel with an internal cross-section corresponding substantially to an external cross-section of said rotor, said body supporting a plurality of coils, said stator being surrounded by a ferromagnetic external envelope, said body being extended by three, four or six radial protuberances made from an electrically insulating material, having, in cross-section, a longitudinal core for receiving a coil, said core being extended by a peripheral extension having an external surface complementary to an internal surface of said envelope and covering a wound area, said method comprising producing said body, winding a conductive wire around each of said cores, and inserting said body thus wound in said envelope.

* * * * *